United States Patent [19]
Freitus et al.

[11] Patent Number: 5,261,680
[45] Date of Patent: Nov. 16, 1993

[54] WATERCRAFT TRANSPORT ASSEMBLY

[76] Inventors: Joseph P. Freitus; Anne H. Freitus, both of P.O. Box 424, West Groton, Mass. 01472

[21] Appl. No.: 837,026

[22] Filed: Feb. 18, 1992

[51] Int. Cl.⁵ .................................................. B62B 1/12
[52] U.S. Cl. .............................. 280/47.331; 114/344; 224/273
[58] Field of Search ............ 280/47.331, 414.2, 414.3; 114/344; 224/273

[56] References Cited

U.S. PATENT DOCUMENTS

| | | | |
|---|---|---|---|
| Re. 32,844 | 1/1989 | Horowitz | 280/641 |
| D. 313,002 | 12/1990 | Henry | D12/317 |
| 2,844,383 | 7/1958 | Deeter | 280/47.331 X |
| 3,068,024 | 12/1962 | Berliner | 280/47.331 X |
| 3,570,730 | 3/1971 | Stevens et al. | 224/42.11 |
| 3,734,367 | 5/1973 | Jackson | 224/262 |
| 3,986,723 | 10/1976 | Brockelsby | 280/47.331 |
| 4,016,615 | 4/1977 | Main | 114/347 |
| 4,081,118 | 3/1978 | Mason | 224/324 |
| 4,236,267 | 12/1980 | Lewis et al. | 114/347 |
| 4,398,488 | 8/1983 | Mathieu | 114/343 |
| 4,804,123 | 2/1989 | French | 224/266 |
| 4,824,127 | 4/1989 | Stamm | 280/47.331 |
| 4,830,387 | 5/1989 | Batten | 280/47.331 |
| 4,850,296 | 7/1989 | Slanker et al. | 114/343 |
| 4,936,595 | 6/1990 | Cunningham | 280/47.331 |

*Primary Examiner*—David M. Mitchell
*Assistant Examiner*—Andrew C. Pike
*Attorney, Agent, or Firm*—Lahive & Cockfield

[57] ABSTRACT

A watercraft transport system is provided which enables watercraft, particularly canoes, to be wheeled over rough terrain in an upright position. The transport system comprises a frame, which may be permanently attached to the watercraft, and dual wheel assemblies which are removably and replaceably attached to the frame on either side of the watercraft. The wheel assemblies are of sufficient length to enable the craft to be supported by the wheels even when the craft is at a slightly inclined angle. In another embodiment, storage sacks are adapted to be mounted within and secured to the frame.

19 Claims, 6 Drawing Sheets

WATERCRAFT TRANSPORT ASSEMBLY

BACKGROUND OF THE INVENTION

The present invention relates to a manual transport and gear storage system for watercraft. More particularly, the invention relates to an apparatus for facilitating the manual, wheeled transport of a watercraft.

Recreational watercraft such as canoes, small boats and dinghies are used under circumstances which often require the craft to be manually transported over land. In some instances it is relatively easy for one or two persons to lift the vessel and carry it to a desired location. However, canoeing and other activities often require the portage over rough terrain of a vessel loaded with gear. Such a portage can be very difficult for two or more people and can be virtually impossible for a single individual.

Portaging of canoes and similar watercraft can be accomplished by lashing paddles or members to the vessel, thus enabling these devices to serve as handles for supporting and carrying the vessel. Those devices which enable paddles or similar members to serve as a yoke system for carrying a watercraft are described in U.S. Pat. Nos. 4,016,615; 4,236,267; 4,804,123; and 4,850,296. In addition, U.S. Pat. No. 3,734,367 describes a shoulder-mounted assembly to enable an individual to carry a canoe. While such devices may be useful, they do not eliminate the need for having to lift and carry a vessel over terrain which is sometime rough. Moreover, many of the devices described in the patents referenced above require the vessel to be inverted, thus making it difficult or impossible to transport the vessel and any gear within the vessel simultaneously.

Wheeled devices are also disclosed which are adapted to be attached to a vessel such as a canoe in order to facilitate manual, wheeled transport of watercraft. Such devices are disclosed in U.S. Pat. Nos. 4,824,127 and 4,936,595. These devices are useful in that they eliminate the need to lift and carry a sometimes heavy watercraft such as a canoe. However, these devices do not solve all the problems attendant to the manual transport of watercraft. For example, the devices disclosed in the '127 and '595 Patents are not adapted to remain secured to the vessel while it is in use. Thus, a significant period of assembly time may be required before a vessel can be adapted for manual transport.

Accordingly, there is still a need for improved devices which assist one in manually transporting a watercraft over land. It would also be desirable to incorporate within such a device a secure and waterproof storage sack in which to stow gear and supplies.

It is thus an object of the invention to provide an apparatus which enables one to easily and safely effect manual, wheeled transport of a watercraft over land. Another object is to provide such an apparatus which may be permanently secured to the watercraft without interfering with use of the vessel. It is also an object to provide such an apparatus having wheels which are easily removed for stowage during use of the vessel in water. A further object of the invention is to provide such an apparatus which includes an integral, secure and waterproof gear stowage system. Other objects of the invention will be apparent upon reading the description which follows.

SUMMARY OF THE INVENTION

The present invention comprises an apparatus which facilitates the wheeled, manual transport over land of a watercraft. The apparatus may be used with virtually all smaller sized vessels which have gunwales, but it is particularly useful with canoes.

The apparatus includes a frame which is adapted to a mount atop the gunwales of the vessel and a locking assembly for securing the frame to the gunwales. In addition, mounting devices are disposed on the frame, adjacent each gunwale, for removably and replaceably mounting a wheel assembly to each side of the frame. Typically one wheel assembly is provided on each side of the vessel. Each assembly includes a suspension system and a wheel on each side of the vessel. The wheel assemblies are constructed such that the suspension system extends in a direction substantially perpendicular to the gunwales of the craft and the wheel attaches at a bottom portion of a suspension arm which forms part of the suspension system. The wheel assemblies are removably and replaceably attachable to the mounting devices, while a support frame to which the wheel assemblies are secured may remain on the vessel. This apparatus enables the craft to be manually transported by inclining one end of the craft at a slight angle while the other end of the craft is supported by and able to be transported by the wheels.

In another embodiment the invention also includes stowage system which comprises secure, waterproof storage containers which are adapted to be removably and replaceably secured to the frame of the transport apparatus. This enables gear and supplies to be safely stored within the vessel without risk of becoming wet or lost in the event of difficult travel conditions or capsize.

DETAILED DESCRIPTION OF THE INVENTION

Figure 1:
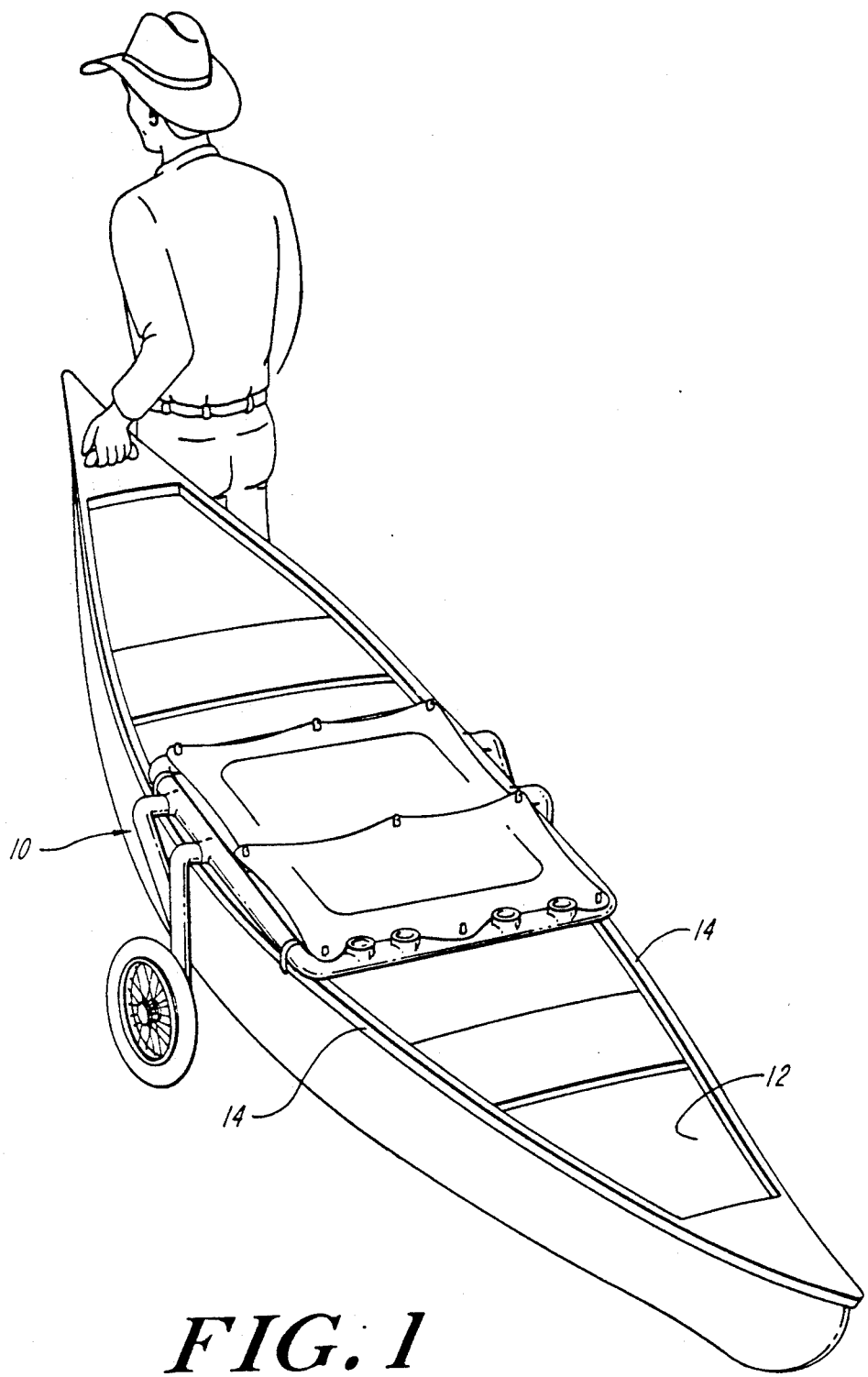
FIG. 1 is a perspective view illustrating the transport apparatus of the invention in use with a canoe.

As illustrated in FIG. 1, the watercraft transport apparatus 10 of the invention facilitates the wheeled, manual transport of a watercraft 12 over land. The transport apparatus preferably is secured to the gunwales 14 of the vessel behind the midpoint of the vessel so as to enable the vessel to be supported by wheels 14 without interference from the hull or the stern even while the bow is inclined at a slight angle.

This description and the associated Figures describe the transport apparatus of the invention with respect to a canoe. However, the invention is applicable to a variety of watercraft, including small boats and dinghies.

Figure 2:
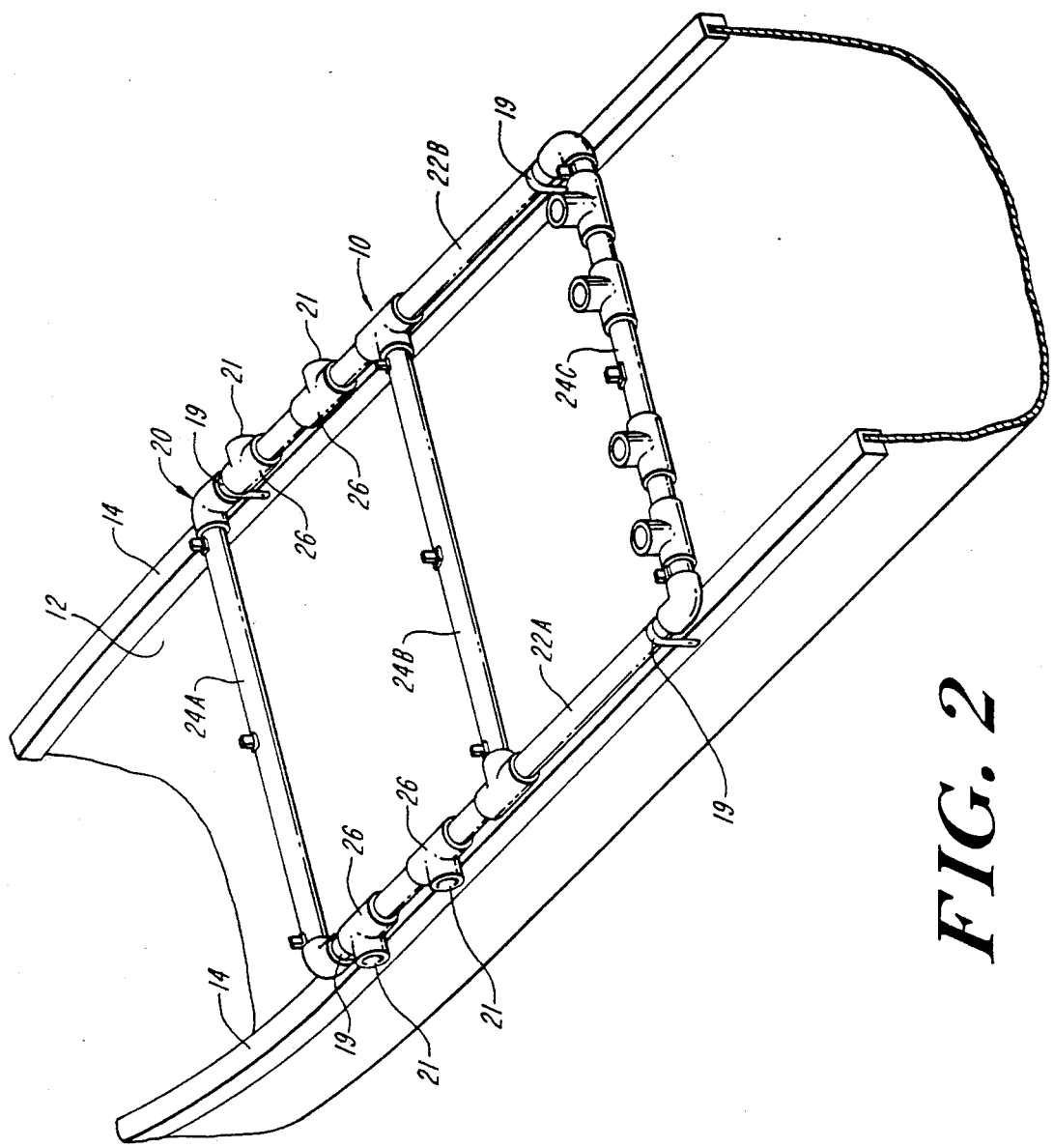
FIG. 2 is a perspective view of a top portion of the transport apparatus of the invention mounted to the gunwales of a canoe.
Figure 3:
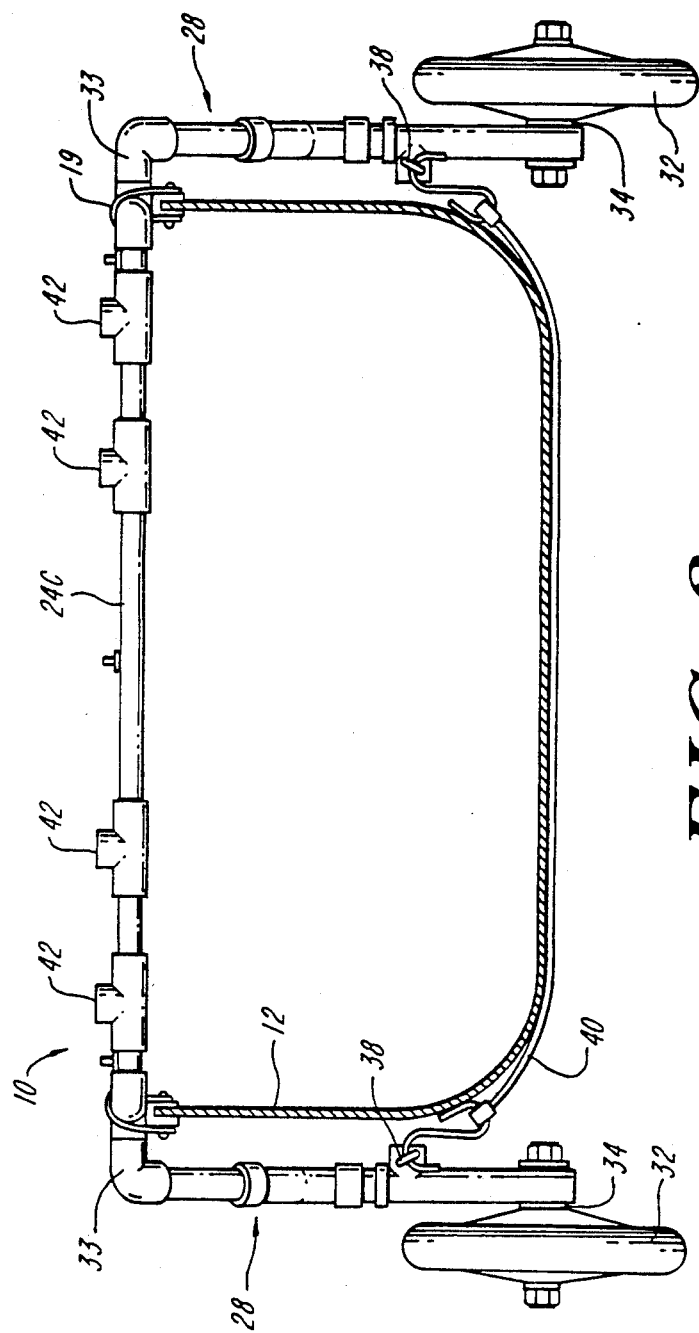
FIG. 3 is an end view of a canoe, partially cut away, illustrating the mounting of the transport apparatus of FIG. 1.
Figure 4:
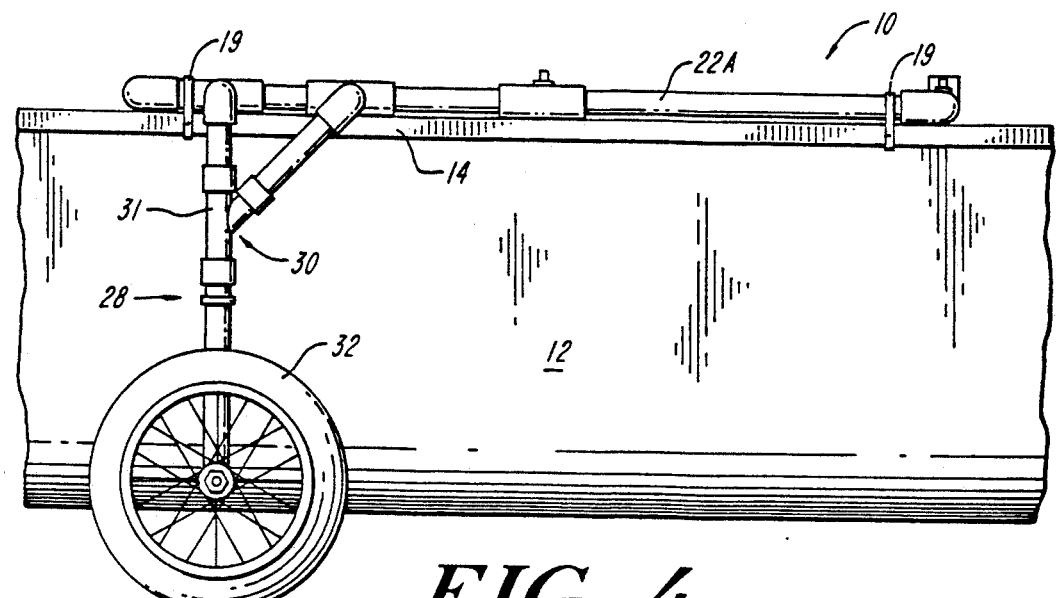
FIG. 4 is a side view of the transport apparatus of FIG. 1 mounted to a canoe.

As illustrated in FIGS. 2, 3, and 4, the apparatus comprises a frame 20 which is secured atop the gunwales 14 of the vessel 12. The frame 20 preferably comprises two substantially parallel support members 22A, 22B, each of which rests upon a gunwale 14 and extends substantially parallel to the gunwale. The support members 22A, 22B are preferably connected by at least one joining member 24. In the illustrated embodiment, the support members are joined by three joining members, 24A, 24B, and 24C. The joining members 24A, 24B, and 24C can be either secured to or integral with support members 22A, 22B and extend in a direction substantially parallel to each other and perpendicular to the support members.

The frame 20 may be secured to the gunwales 14 by any one of a variety of fastening mechanisms. For example, a clip mechanism may be mounted on the gunwales and adapted to pass through apertures (not shown) disposed in frame 20 to facilitate locking of the frame to the gunwales. Alternatively, clamps or straps can be adapted to extend from the gunwales, around either the support member or joining members of the frame, to secure the frame to the craft. In the illustrated embodiment, adjustable straps 19 secure the frame 20 to gunwales 14.

As shown in FIG. 2, sleeves 26 are secured to or are integral with the support members 22A, 22B of frame 20. Preferably, the sleeves are oriented such that their opening 21 lies in a horizontal plane directed outward from the center of the vessel. Sleeves 26 are adapted to interferingly engage a portion of wheel assembly 28.

As illustrated in FIGS. 3 and 4, the wheel assembly 28 includes a suspension system 30, wheel 32, and spindle 34. In one embodiment the suspension system 30 may comprise a Y-shaped suspension arm 31 as best shown in FIG. 4. The suspension arm 31 preferably is constructed of hollow tubing or piping and is adapted to extend downwardly from the frame. The arm 31 is generally of sufficient length such that a upon mounting a wheel 32 to the bottom end of arm 31 a canoe may be supported by the wheels without interference from the hull of the vessel. An upper portion of the suspension arm 31 includes a horizontally oriented strut extension member 33 which is adapted to be interferingly received by sleeve 26 mounted on frame 20.

Figure 8:
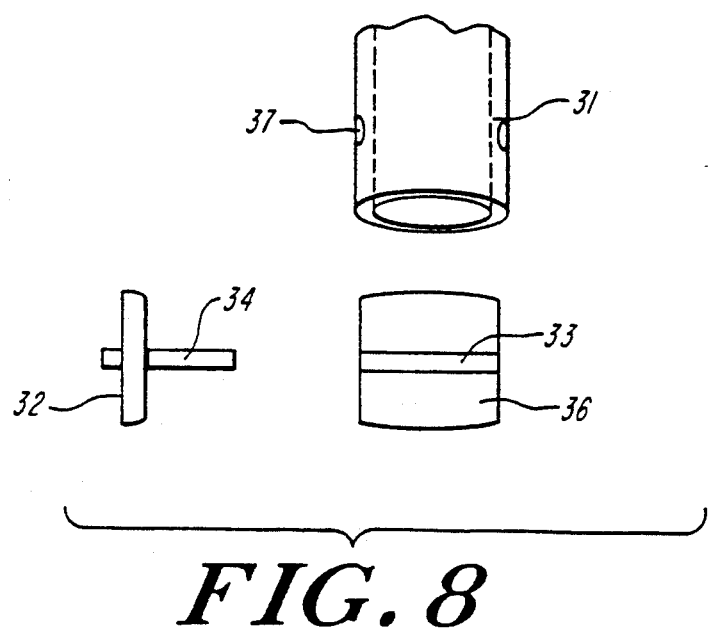
FIG. 8 is an exploded view of one embodiment of a wheel mounting assembly for the transport apparatus of FIG. 1.

Preferably, the wheels 32 are mounted upon a spindles 34. Each spindle 34 preferably is disposed in an aperture formed in a lower portion of the suspension arm 31 and may be secured in place by a device such as a cotter pin. In another embodiment, illustrated in FIG. 8, a bushing insert 36 may be placed within a hollow, bottom end of the arm 31. The spindle 34 then passes through the aperture 37 in the arm 31 and through the bushing 33 formed in the bushing insert 36. The spindle 34 may then be secured as described above.

Eyelets 38, or similar structures, may be disposed on the inboard facing side of a lower portion of each suspension arm 31. The eyelets 38 are adapted to engage opposite ends of a strap 40 which extends from each arm 31 around the bottom of the craft 12. The use of such a strap further secures the wheel assembly 28 in place against the sides of the craft and prevents the wheel assemblies 28 from spreading too great a distance from the sides of the vessel. Various types of elasticized or rubberized strapping materials are suitable for this application.

Figure 7:
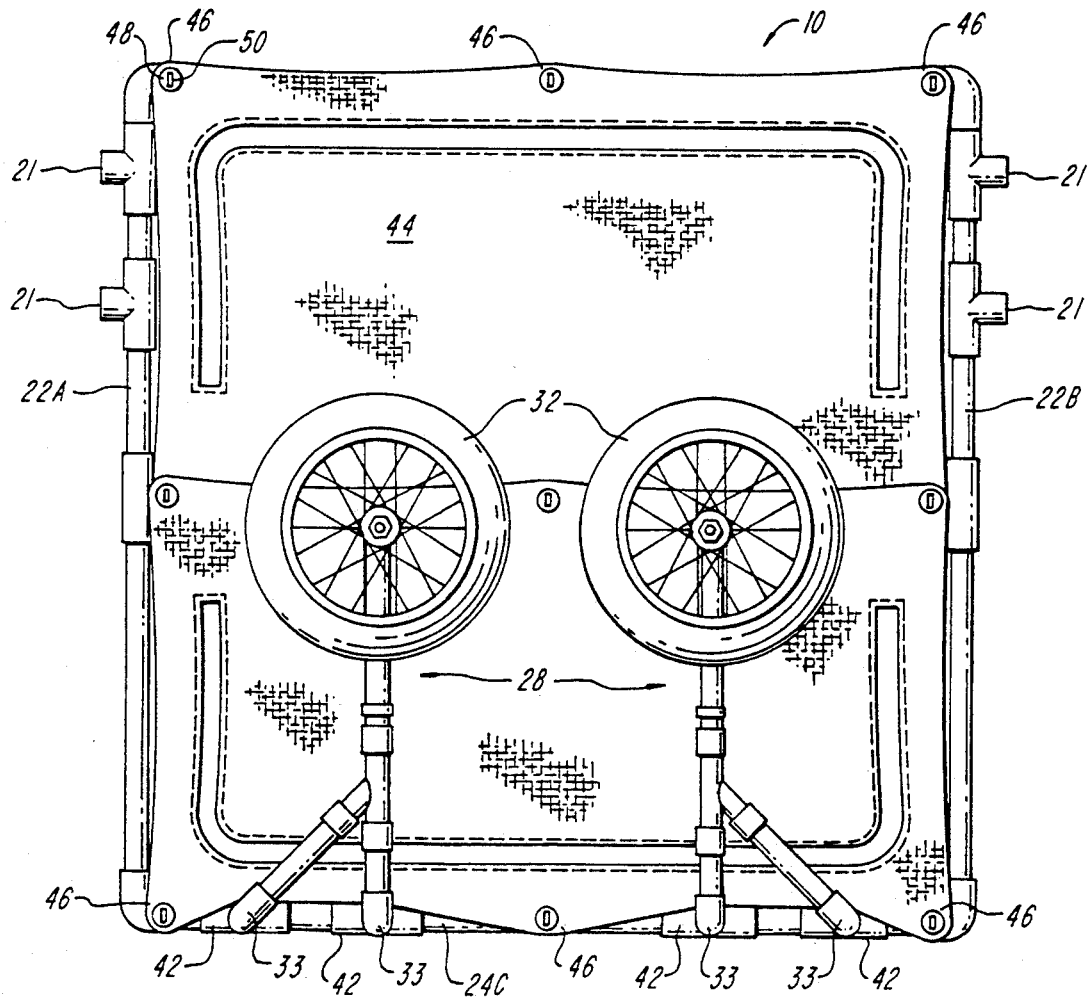
FIG. 7 is a top view of the transport apparatus of FIG. 1, illustrating the wheel assemblies in a stowed condition.

As so constructed the wheel assemblies 28 are easily removed and replaced on the frame. That is, when it is necessary to transport a canoe or other watercraft using the apparatus of the invention, the wheel assemblies may easily and quickly be attached to the frame by mating the extension members 33 of the wheel assemblies 28 with the sleeves 26 of the frame. To further secure the wheel assemblies, a strap 40 may extend from each eyelet 38 mounted on inboard sides of the suspension arms 31. The wheel assemblies 28 can be removed by reversing the procedure described above. As shown in FIG. 7, removed wheel assemblies 28 may be stowed on the frame 20 by mating the extension members 33 with sleeves 42 mounted on joining member 24C. This ensures that wheel assemblies are neatly and securely stowed during use of the craft. In the event of capsize or if rough water is encountered, the wheel assemblies 28 should remain secured in place in sleeves 42.

The frame 20 and the various elements which make up the frame may be constructed of a variety of materials which have a generally high strength to weight ratio. These members may be made of material such as plastic, graphite-based materials, or aluminum tubing. Suitable plastic materials, include polyvinyl chloride and polyolefins (e.g. polypropylene and polyethylene).

As noted, the support members 22A, 22B of the frame are joined to each other by at least one joining member 24 which extends perpendicularly between the two support members. In a preferred embodiment three equally spaced joining members 24A, 24B and 24C, as illustrated in FIG. 2, extend between support members 22A, 22B. Alternatively, joining members 24A, 24C may be used alone, or joining member 24B may be used alone.

A further feature of the invention involves the use of one or more waterproof sacks 44, adapted to mount in a space or spaces formed by support members 22 and joining members 24. The sack or sacks 44 preferably are constructed of waterproof material. Suitable waterproof materials are well known in the art and include Nylon or polypropylene fabrics coated or lined with a waterproof material. A currently used material is sold under the trademark CORDURA (available from DuPont) which is a polypropylene fabric having a waterproof polyurethane coating. In addition, a material sold under the trademark TYVEK (available from DuPont) may be used as a waterproof lining material to be used on either the inside or outside of the sack.

Figure 5:
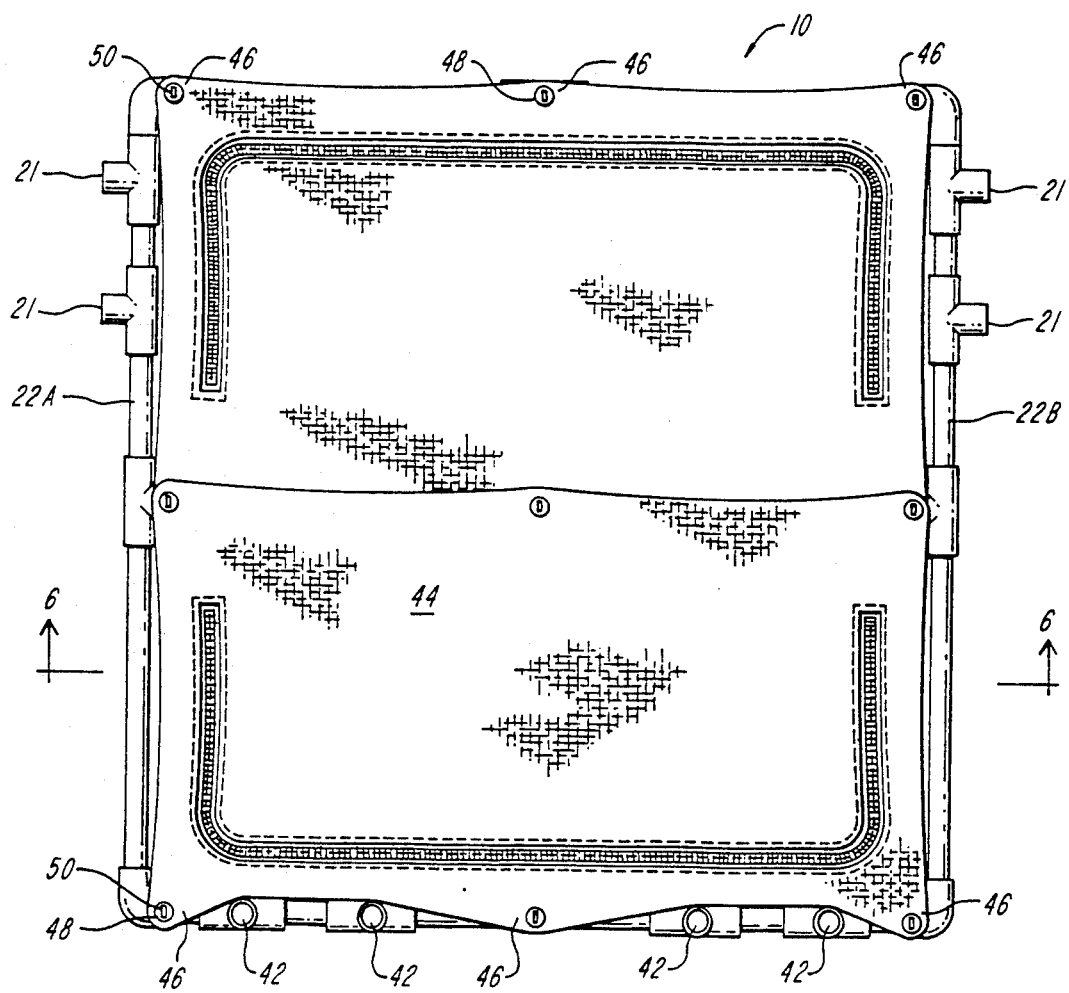
FIG. 5 is a top view of the transport apparatus of FIG. 1, including a storage sack secured thereto.
Figure 6:
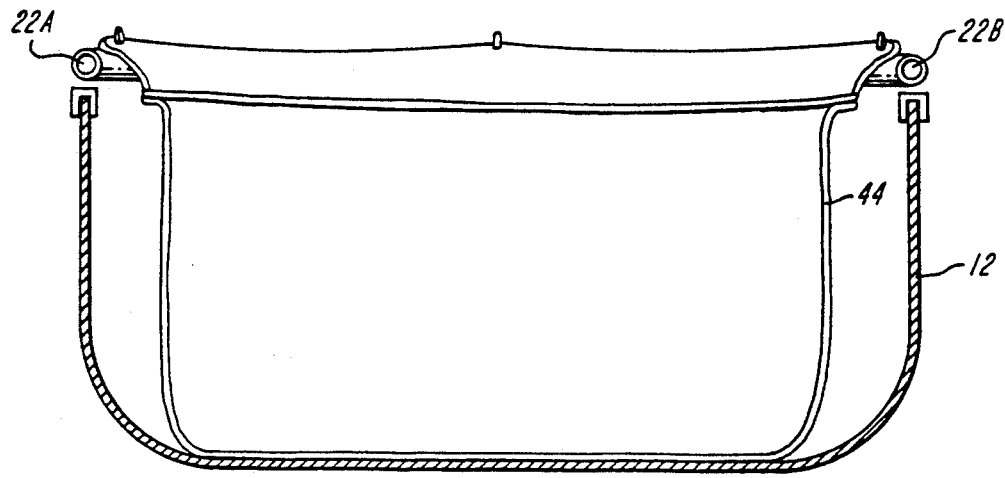
FIG. 6 is an end view of the storage sacks shown in FIG. 5.

The sacks 44 are adapted such that the bottom of the sack rests on the deck of the vessel. In addition, as illustrated in FIG. 5, tabs 46 are formed in the fabric of the sack 44. The tabs 46 include apertures 48 which are adapted to engage clamps, such as grommets 50, mounted upon the frame 20. Alternatively, straps containing a hook and loop fastener such as is sold under the trademark VELCRO may be used to secure the sacks. As so constructed, the sacks are secured within the craft such that the sacks will not become dislodged upon capsize or due to travel through rough water. Moreover, the waterproof nature of the sacks 44 enables gear and clothing to be maintained within the sacks without becoming wet or damp.

Further modifications to sacks 44 may also be made. For instance, exterior compartments, suitable to hold a camera or other equipment, may be attached by VELCRO fastening material to the sides of sacks 44, allowing easy access to frequently used equipment.

It is understood that various modifications may be made to the invention without departing from the intended scope of the invention.

What is claimed is:

1. An apparatus for manually transporting a watercraft having two opposed gunwales, comprising:
 a frame adapted to mount atop the gunwales of the watercraft;
 locking means for securing the frame to the gunwales, the locking means being mounted upon the gunwales and adapted to engage the frame;
 mounting means disposed on the fame, adjacent each gunwale, for removably and replaceably mounting a first and second wheel assembly, in an operable position, to each side of the frame; and
 the first and second wheel assemblies each including a suspension arm and a first wheel, wherein at least a portion of each suspension arm extends in a substantially vertical direction, substantially perpendicular to the opposed gunwales of the watercraft and at least a portion of each wheel extends below a bottom of a hull of the watercraft, the first and second wheel assemblies each being removable and replaceable attachable to the mounting means.

2. The apparatus of clam 1 wherein the frame further comprises two parallel support members, each adapted to mount upon the two opposed gunwales of the watercraft, the two support members being connected by at least one joining member which is joined to each of the support members.

3. The apparatus of claim 2 wherein the two support members are connected to each other by two joining members which extend parallel to each other and perpendicular to the support members.

4. The apparatus of claim 2 wherein the two support members are connected to each other by three joining members which extend parallel to each other and perpendicular to the support members.

5. The apparatus of claim 4 further comprising two storage sacks, each being configured to mount within one of two substantially rectangular spaces defined by the support members and the joining members.

6. The apparatus of claim 2 wherein the storage sacks are secured to the frame by a sack locking mechanism.

7. The apparatus of claim 6 wherein the sack locking mechanism comprises grommets mounted upon the frame which interlockingly engage apertures disposed on the sacks.

8. The apparatus of claim 7 wherein the sacs are waterproof.

9. The apparatus of claim 2 wherein the locking means comprises a plurality of straps which are secured to the gunwales and are adapted to secure the frame to the gunwales.

10. The apparatus of claim 9 wherein the locking means further comprises a selectively engageable securement strap which extends from one of the suspension arms, around the hull of the watercraft, to the other suspension arm.

11. The apparatus of claim 2 wherein the mounting means is disposed on each support member.

12. The apparatus of claim 11 wherein the mounting means comprises at least one sleeve mounted upon each support member, each sleeve being adapted to lockingly receive a portion of the suspension arm of each of the first and second wheel assemblies.

13. The apparatus of claim 12 wherein the mounting means comprises two sleeves mounted adjacent each other on each support member and adapted to lockingly receive corresponding extension members of each suspension arm.

14. The apparatus of claim 12 wherein each suspension arm comprises a substantially Y-shaped structure having a single leg at a bottom end thereof, each of which is adapted to mount one of the wheels thereto, and two forked members at a top portion thereof having horizontally oriented extensions which are adapted to interlockingly mate with the sleeves of the mounting means.

15. The apparatus of claim 14 wherein the wheel assemblies are adapted to be secured to the frame while not engaged by the mounting means.

16. The apparatus of claim 2 further comprising at least one storage sack configured for placement with the watercraft in a space defined by the support members and the joining member.

17. The apparatus of claim 2 wherein the frame, the mounting means, and the wheel assemblies are adapted to enable the watercraft to be transported by lifting an end of the watercraft while a remainder of the watercraft remains supported by the wheels of the apparatus.

18. The apparatus of claim 2 wherein the frame is adapted to remain secured to the watercraft during use of the watercraft.

19. A manual transport and storage system for a watercraft comprising:
 a frame adapted to mount upon gunwales of the watercraft;
 locking means for securing the frame to the gunwales;
 mounting means disposed on the frame, adjacent each gunwale, for removably and replaceably mounting a first and second wheel assembly to each side of the frame;
 the first and second wheel assemblies each including a suspension arm and a wheel, wherein at least a portion of each suspension arm extends in a direction substantially perpendicular t the gunwales of the watercraft and at least a portion of each wheel of the first and second wheel assemblies extends below a bottom of a hull of the watercraft, the first and second wheel assemblies each being removable and replaceably attachable to the mounting means; and
 at least one storage receptacle adapted to mount within the watercraft, in a space defined by the frame, the storage receptacle being removable and replaceably affixed to the frame.

* * * * *